Oct. 24, 1950     J. MARTIN     2,527,020
EJECTION SEAT FOR AIRCRAFT
Filed June 9, 1948     12 Sheets-Sheet 1

Inventor
JAMES MARTIN.
per Worth Wade
Attorney.

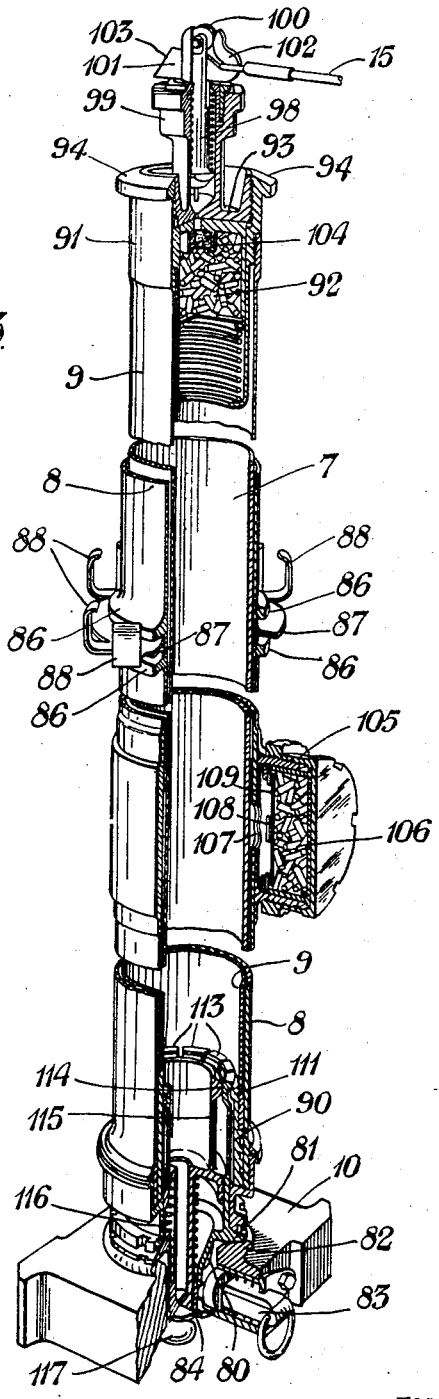

Oct. 24, 1950  J. MARTIN  2,527,020
EJECTION SEAT FOR AIRCRAFT
Filed June 9, 1948  12 Sheets-Sheet 4
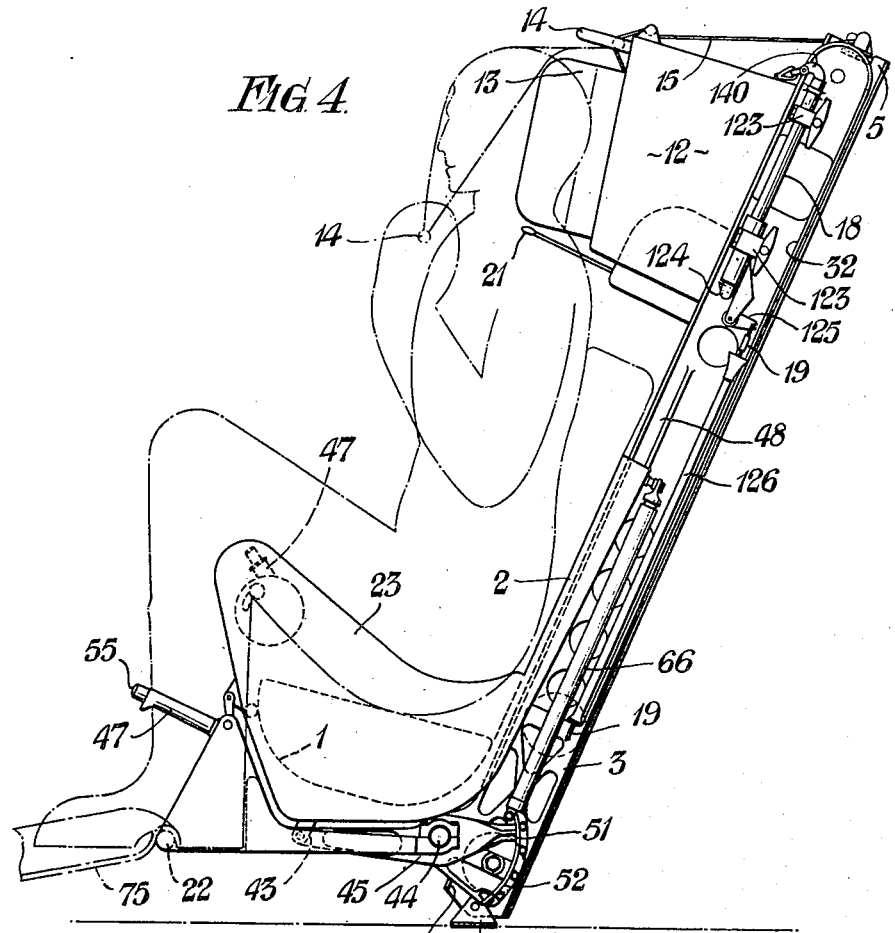
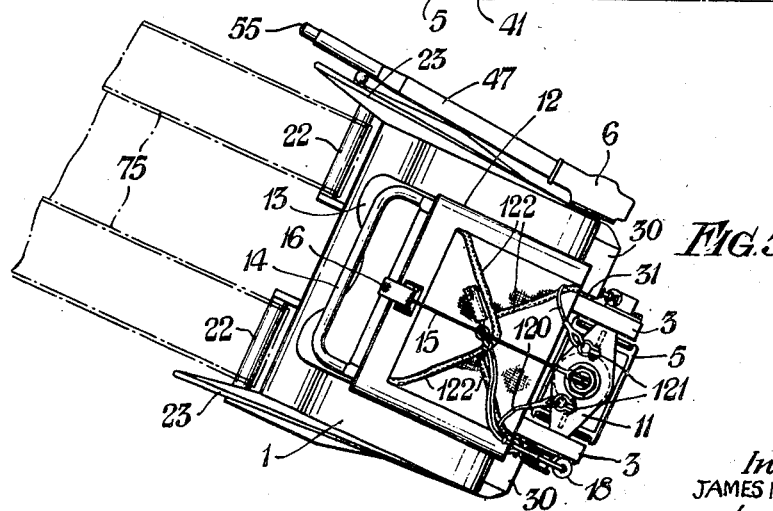
Inventor
JAMES MARTIN.
per Worth Wade
Attorney.

Oct. 24, 1950  J. MARTIN  2,527,020
EJECTION SEAT FOR AIRCRAFT
Filed June 9, 1948  12 Sheets-Sheet 5

Inventor
JAMES MARTIN.
per Worth Wade
Attorney.

Oct. 24, 1950   J. MARTIN   2,527,020
EJECTION SEAT FOR AIRCRAFT
Filed June 9, 1948   12 Sheets-Sheet 6
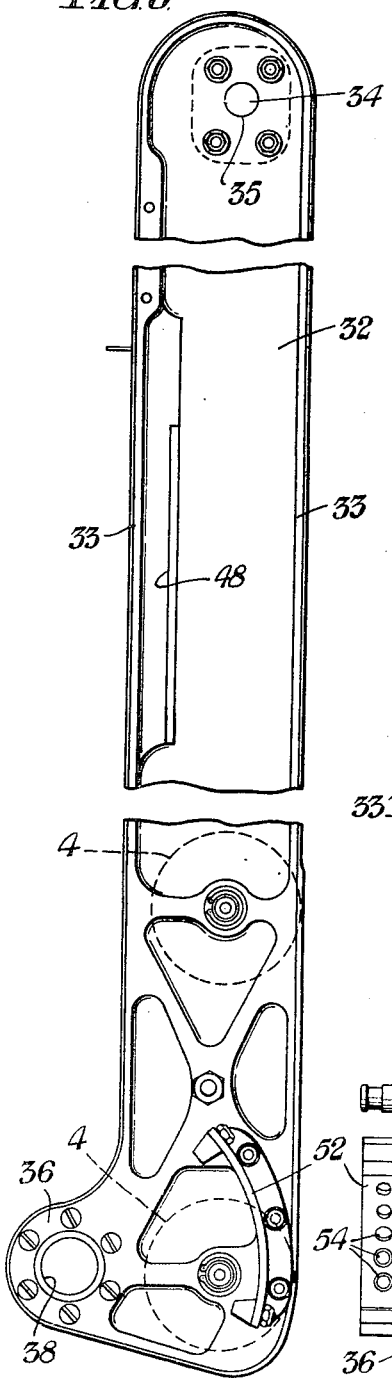
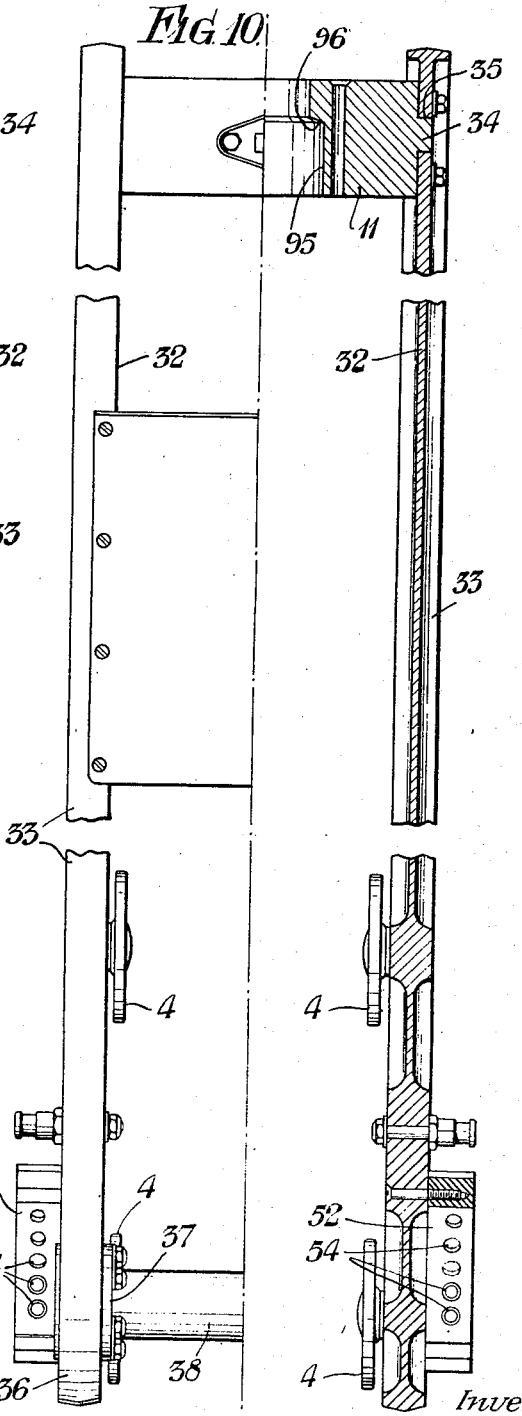
Inventor
JAMES MARTIN.
per Worth Wade
Attorney.

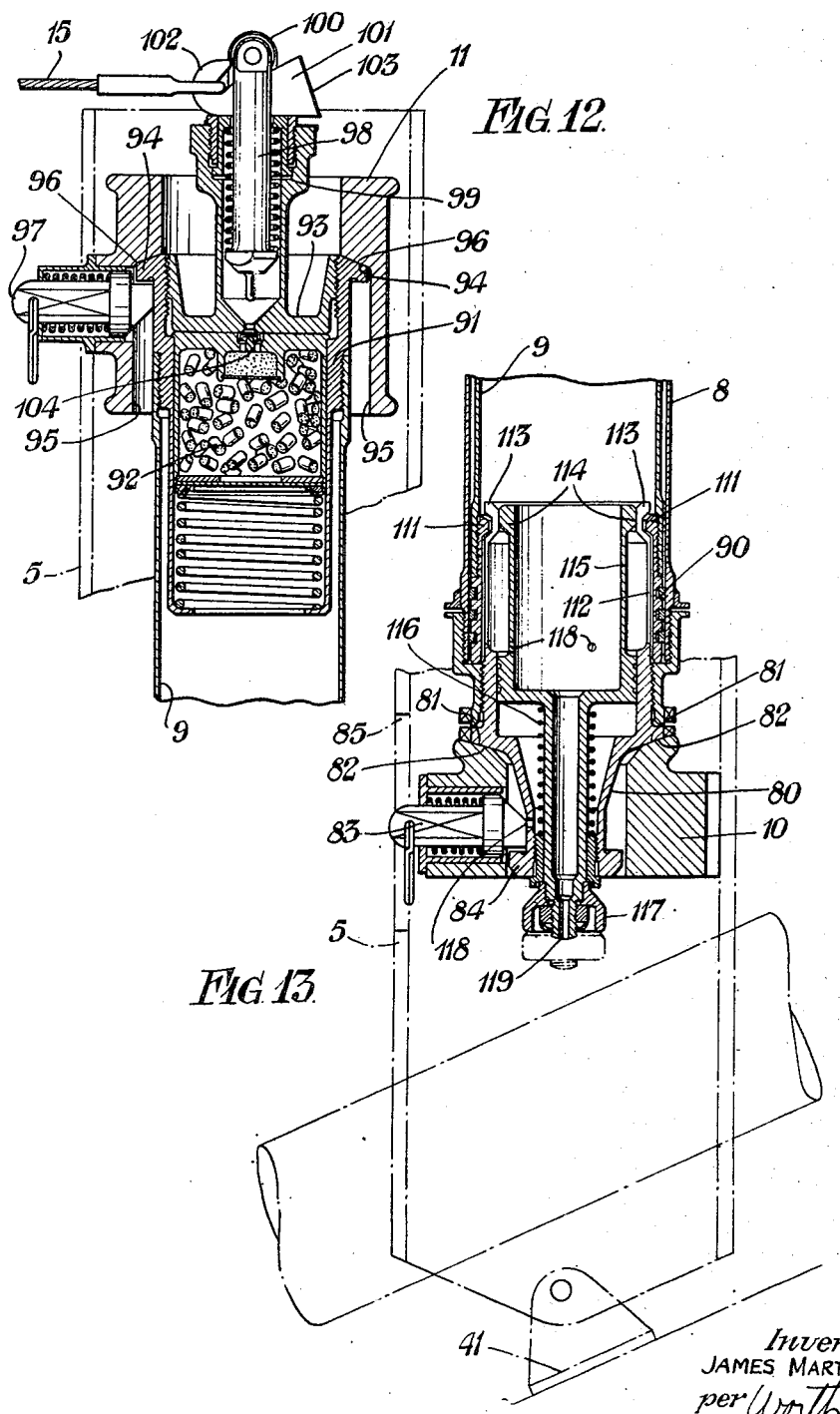

Oct. 24, 1950     J. MARTIN     2,527,020
EJECTION SEAT FOR AIRCRAFT

Filed June 9, 1948     12 Sheets-Sheet 9

Inventor
JAMES MARTIN.
per Worth Wake
Attorney.

Oct. 24, 1950 J. MARTIN 2,527,020
EJECTION SEAT FOR AIRCRAFT
Filed June 9, 1948 12 Sheets-Sheet 10
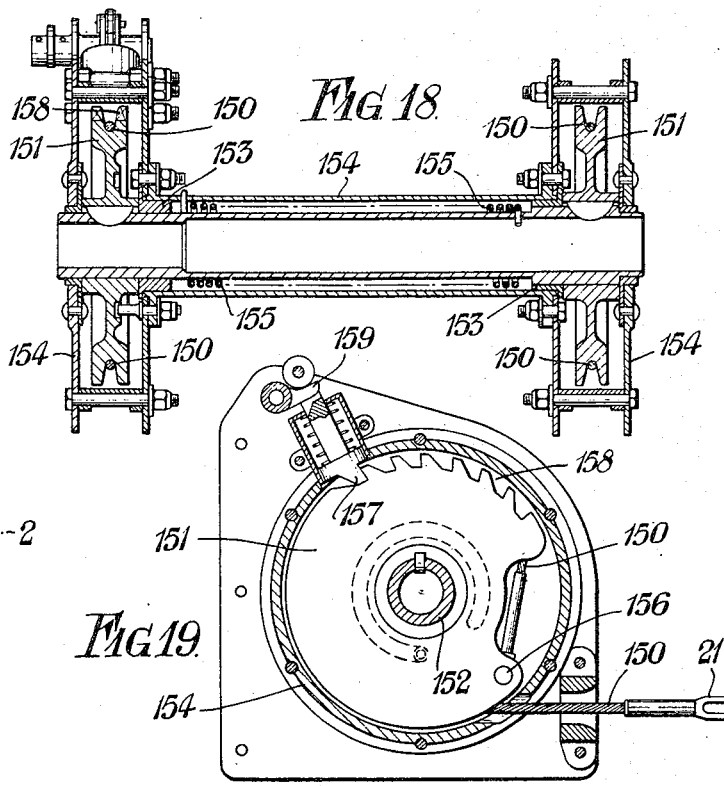
Inventor
JAMES MARTIN
per Worth Wade
Attorney

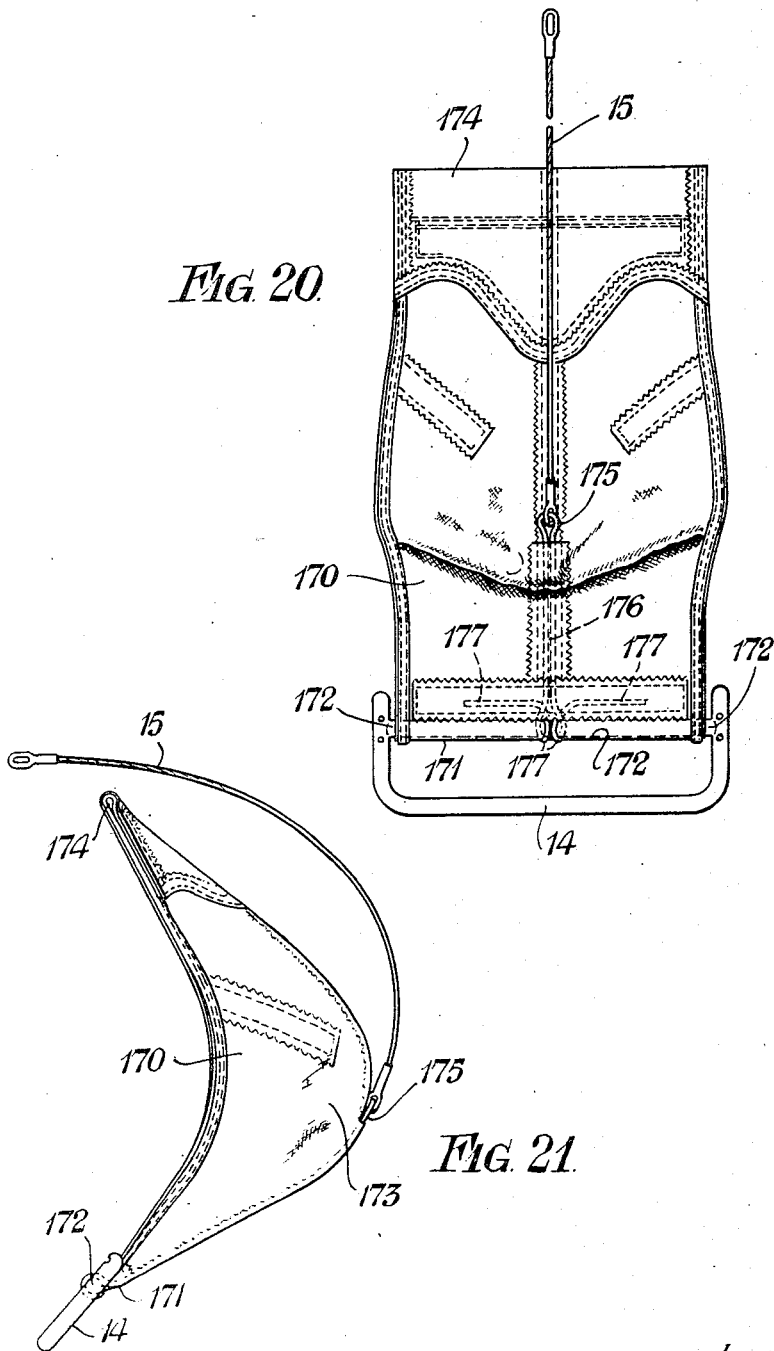

Oct. 24, 1950  J. MARTIN  2,527,020
EJECTION SEAT FOR AIRCRAFT
Filed June 9, 1948  12 Sheets-Sheet 12
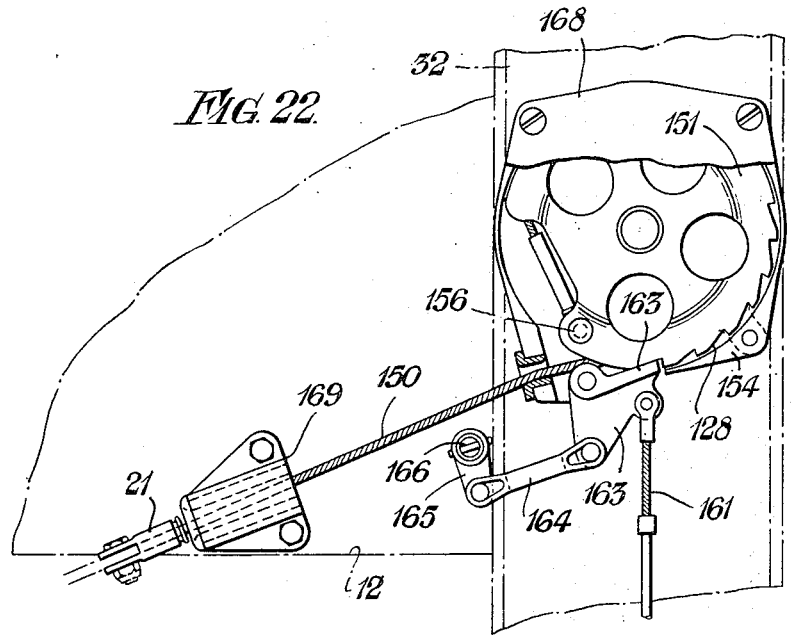
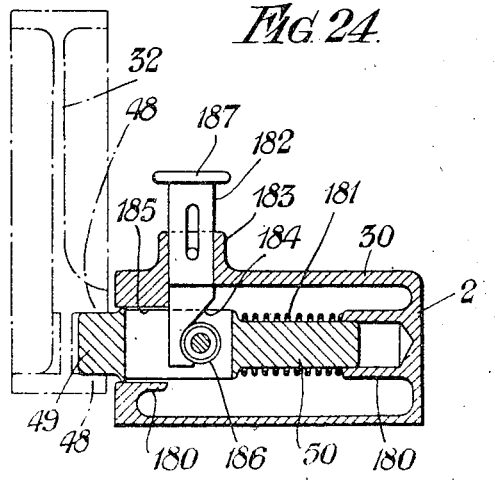
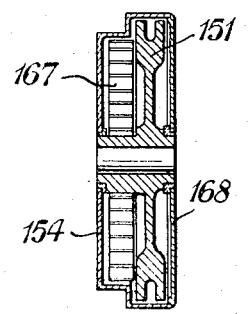
Inventor
JAMES MARTIN.
per Worth Wade
Attorney.

Patented Oct. 24, 1950

2,527,020

UNITED STATES PATENT OFFICE 2,527,020

EJECTION SEAT FOR AIRCRAFT

James Martin, Higher Denham, England

Application June 9, 1948, Serial No. 31,913
In Great Britain July 10, 1947

7 Claims. (Cl. 244—122)

This invention relates to an ejection seat for aircraft of the type which is adapted to be launched from an aeroplane or other aircraft with the occupant seated therein and provided with mechanism by which the seat may be launched from the aircraft by means of an ejection unit actuated by pressure generated from one or more explosive cartridges. An object of the invention is to provide an improved construction and arrangement of the seat which enables the pan of the seat to be adjusted relatively to the frame to adapt it for use by pilots or others of varying height or length of limb.

The invention is particularly applicable for use with the seat for aeroplanes described and illustrated in our patent application No. 638,762, filed January 3, 1946, now U. S. Patent No. 2,467,763, issued April 19, 1949. The seat is particularly suitable for use by the pilot of a high speed aeroplane such as a jet propelled fighter type of aeroplane. The cabin of a high speed fighter aeroplane is very restricted and the hood is carefully streamlined and it is kept low so as to limit the extent to which it projects from the general contour of the aeroplane body. The seat must be adjustable to enable the occupant to use the gun-sight correctly, and to provide a proper line of vision for other purposes. The present invention enables the desired adjustment to be made without increasing the height of the hood and at the same time permits the use of a relatively long fixed stroke ejection unit.

Another object of the invention is to provide an improved construction and arrangement of ejection unit or gun for ejecting the seat and its occupant from an aeroplane. This enables the seat to be locked in position and to be automatically released when the ejection mechanism is actuated. It also enables the seat and the ejection unit to be easily and quickly released and detached from its mounting in the aeroplane for removal when required. The invention ensures that the seat is positively and securely locked in position in the aeroplane but is instantly and automatically released when the ejection mechanism is actuated or may be quickly released and removed by hand when required.

A further object of the invention is to provide improved constructional details to ensure effective and efficient operation of the ejection seat under all conditions and whenever required and at the same time to provide the maximum of protection for the occupant of the seat whilst requiring a minimum of preparatory action on his part.

A practical example of an ejection seat embodying the constructional features and advantages of the present invention will now be described in detail with reference to the accompanying drawings in which—

Fig. 3 is a perspective view to a somewhat larger scale, of the ejector gun partly in section to show the internal construction and arrangement thereof.

Figs. 4 and 5 are diagrammatic side elevation and plan view of the complete seat.

Figs. 9 and 10 are side and front elevation partly broken away and partly in section of the seat supporting and guide frame.

Fig. 12 is a vertical section through the combustion chamber and cartridge firing mechanism of the ejecting gun.

Fig. 13 is a vertical section through the locking device for retaining the seat and the automatic release mechanism for freeing the seat when the ejection gun is fired.

Fig. 17 is a diagrammatic view of part of the seat showing the harness release mechanism.

Figs. 18 and 19 are longitudinal and transverse sections of the harness release mechanism.

Figs. 20 and 21 are front and side elevation of the face protecting screen.

Figs. 22 and 23 show a modified harness release mechanism and

Fig. 24 is a sectional detail of a seat mounting abutment.

Figure 1:
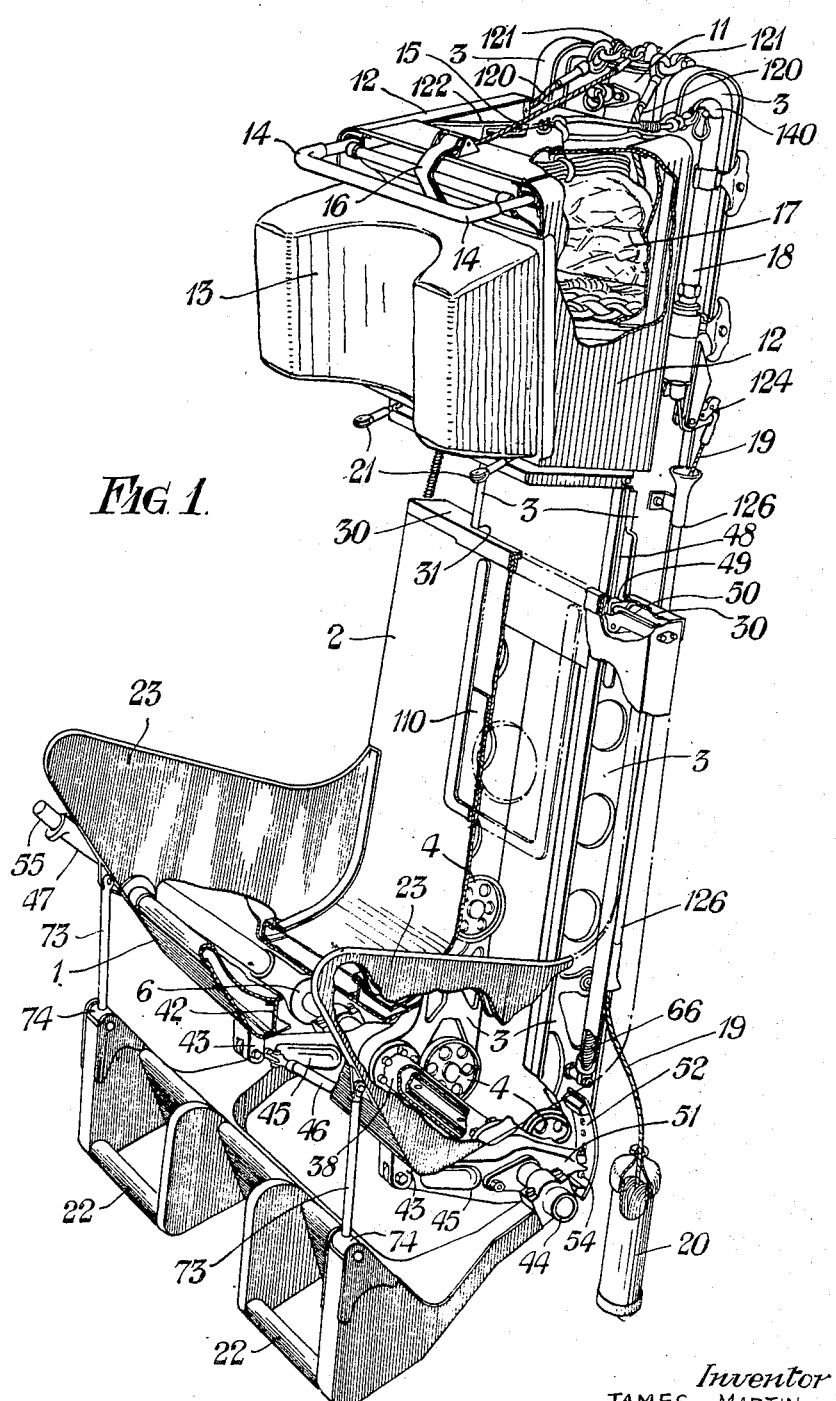
Fig. 1 is a front perspective pictorial view of an ejection seat having some parts broken away to show details.

Referring more particularly to Figs. 1 to 5 of the drawings, the seat 1 is of sheet metal construction slidably mounted by its back 2 for adjustment in height on the seat frame 3 which is provided with rollers 4 which engage in channels in the fixed guide 5 see Figs. 4 and 5 to enable the seat and its frame to be ejected from the aeroplane in which it is mounted. Hand operated seat adjusting mechanism 6 is provided for raising or lowering the seat on its frame 3 to accommodate a short or tall occupant. Between the fixed guide 5 and the seat frame 3 is located the ejection gun (Figs. 2 and 3) for ejecting the seat from the aeroplane. This comprises a cylinder 8 and a ram 9 slidable on one another and which act between a mounting block 10 in the fixed guide 5 and a cross beam 11 of the seat frame 3. The ejection gun is formed with a firing chamber for an explosive cartridge and is fitted with a removable breech block and firing mechanism for discharging the cartridge when it is desired to eject the seat from the aeroplane (more fully described hereafter). Mounted on the front of the seat frame 3 and above the back 2 of the seat 1 is a container 12 on the front of which is supported the shaped head-rest 13. Above the head-rest 13 is a handle 14 connected to a protective screen adapted to be drawn down in front of the occupant of the seat and this handle and screen are connected by the flexible cable 15 to the cartridge firing mechanism so that the act of bringing the screen into position will actuate the firing mechanism to discharge a cartridge in the firing chamber to fire the ejection gun and eject the seat and its occupant from the aeroplane. The handle 14 is intended to be grasped by both hands of the occupant of the seat, so that the act of drawing the protective screen into position, automatically locates the occupant's hands and arms in a compactly folded position against the body at the same time that the firing mechanism is actuated to eject the seat and occupant from the aeroplane. The pivoted hook 16 of relatively soft material, normally retains the handle 14 in the position shown in Fig. 1, but readily gives way to superior force when the occupant pulls on the handle 14 with both hands.

In the container 12 is a compartment for a folded drogue parachute 17 connected to the cross beam 11 of the seat frame 3 and on one of the side members of the seat frame 3 is mounted a drogue gun 18 with firing chamber for a cartridge and firing mechanism for its discharge after the seat has been ejected from the aeroplane. This is effected automatically by a static line 19 in a container 20 anchored to the aeroplane, the static line being automatically released from the firing mechanism as soon as this has been actuated, thereby completely separating the seat from the aeroplane. In a lower compartment in the container 12 is provided a releasable harness control mechanism having connections 21 for securing to the harness of the occupant of the seat and which are arranged to provide an effective anchorage for the harness whilst permitting a limited amount of freedom of movement when required. Footrests 22 are suspended beneath the front of the seat to receive the occupant's feet and the side wings 23 of the seat correctly position his legs and prevent them from being separated by wind pressure when the seat is ejected from the aeroplane.

Figure 6:
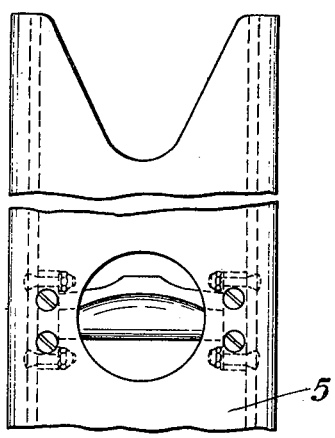
Figs. 6 and 7 are side and front elevation of the seat guide partly broken away for convenience.
Figure 7:
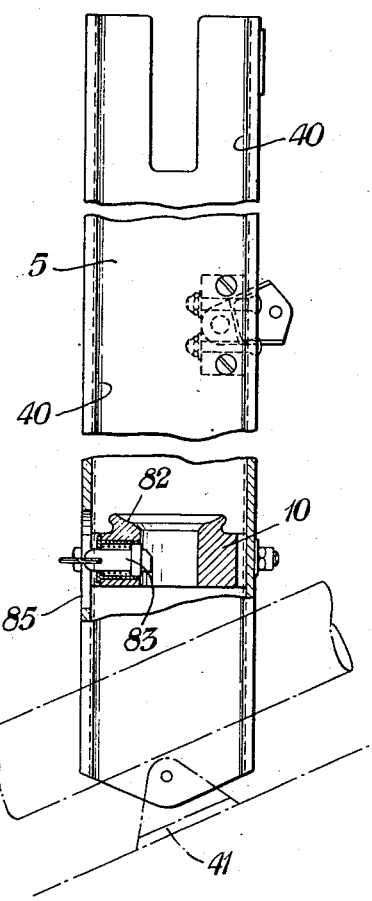
Figure 11:
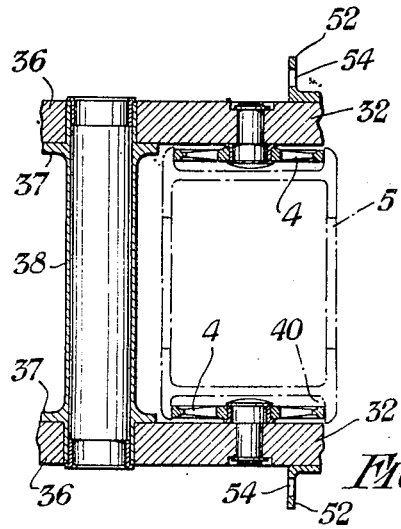
Fig. 11 is a sectional plan view of the lower end of the seat supporting and guide frame.
Figure 8:
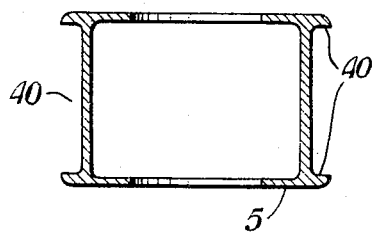
Fig. 8 is a transverse section of the guide.

In Figs. 4 and 5, the complete ejection seat is shown mounted in the cockpit of a fighter type of aeroplane. The seat 1 is constructed of sheet metal so that the seat pan projects forwardly from the seat back 2 which has a hollow box form girder 30 at each side leaving a recess 31 in the seat back which fits over the seat frame 3 and the fixed guide 5. Figs. 9, 10 and 11 show the seat frame in detail and Figs. 6, 7 and 8 show the construction and arrangement of the fixed guide. Two light rigid frame members 32 having flanged edges 33 are connected together at their upper ends by the cross beam 11 to which they are bolted so that the spigots 34 are firmly locked in the sockets 35 in the frame members 32. At their lower ends, the frame members 32 are each formed with a forwardly projecting lug 36 between which are bolted the flanged ends 37 of a tubular distance piece 38. On the inner face of the frame members 32 are supported fixed bearing pins for two pairs of rollers 4 located at suitable intervals apart and near the lower end of the frame 3. These rollers 4 engage in the two channels 40 at each side of the fixed guide 5 which is secured at its lower end to the bracket 41 adapted to be secured to the floor or other fixed part of the aeroplane structure.

Figure 14:
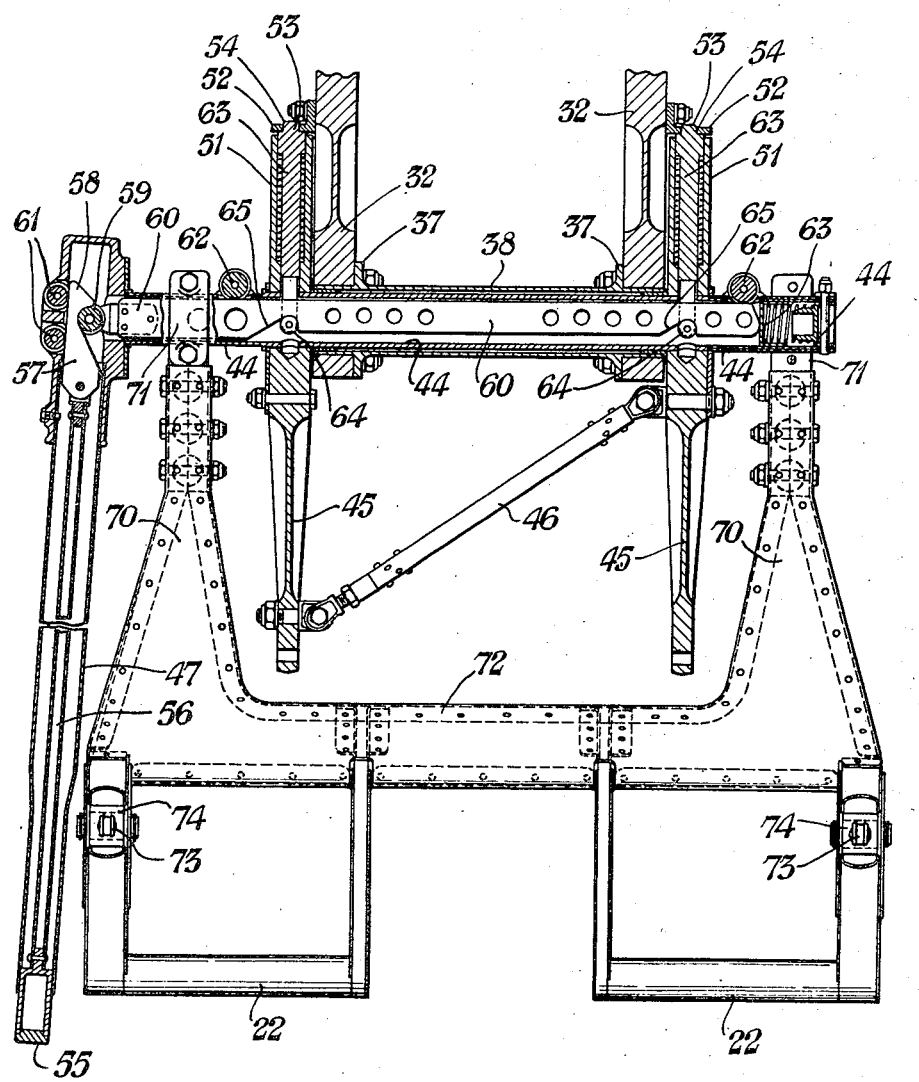
Fig. 14 is a plan view partly in section showing the seat supporting and adjusting mechanism and also the foot rests.

The seat supporting and adjusting mechanism is shown in Figs. 1, 2, 4, 5 and in detail in Fig. 14. Within the hollow pan of the seat 1 is provided the transverse channel shaped stiffening member 42 beneath which are secured the lugs 43. Mounted to turn in bearings in the ends of the tubular distance piece 38 is a hollow shaft 44 on which is fixedly mounted the two lever arms 45 whose outer ends are pivotally engaged in the lugs 43 on the underside of the pan of the seat 1. A diagonal strut 46 connects the inner end of one of the lever arms 45 with the outer end of the other lever arm 45 so as to impart stiffness to the structure and avoid side sway of the seat 1. On one end of the hollow shaft 44 is secured the hand lever 47 by which the seat may be raised and lowered. To permit this, short channel guides 48 are provided on the outer face of each frame member 32 and inwardly directed abutments 49 each supported on a pivotal shaft 50 in the upper end of the seat back 2, engage in these guides 48 see Fig. 1. to provide a sliding and pivotal connection between the upper end of the seat back 2 and the frame members 32 of the frame 3. The seat 1 is supported by the lugs 43 pivotally connected to the forward ends of the lever arms 45 fixed on the hollow shaft 44. Each of the lever arms 45 has a rearward extension 51 the end of which extends close to a quadrant 52 one of which is provided on each of the frame members 32 and a locking catch 53 is provided in each extension 51 to engage in any pair of holes 54 in the quadrants 52 to secure the seat 1 in any position to which it may be adjusted by the hand lever 47. The locking catches 53 are controlled by a press knob 55 on the end of the hand lever 47. This knob 55 is mounted in the end of a tubular push rod 56 connected also to the slidable wedge-shaped cam 57. This cam 57 has a pointed hook shaped end 58 which engages with a roller 59 on the end of a slidable cam plate 60 mounted to slide axially in the tubular shaft 44. The cam 57 is backed up by and slides against the anti-friction rollers 61. The cam plate 60 slides against anti-friction rollers 62 and is pressed axially toward the cam 57 by the spring plunger 63 in the far end of the shaft 44. In the rearward extensions 51 of the lever arms 45 are slidably mounted the spring pressed tappets 63 the rear ends of which project and form the locking catches 53 which engage the holes in the quadrants 52. The other ends of the tappets 63 are forked to receive the cam plate 60 and a roller 64 on the end of each tappet engages with an inclined cam face 65 on the cam plate 60 and normally rests at the bottom of each cam face 65 with the locking catches 53 projecting into engagement with a pair of the holes 54 in the quadrants 52. Pressure on the knob 55 will slide the cam 57 against the roller 59 and force the cam plate 60 to move to the right against the spring plunger 63. The rollers 64 on the tappets 63 will ride up the cam faces 65 and the locking catches 53 will be withdrawn from engagement with the quadrants 52. Movement of the hand lever 47 up or down will raise or lower the seat and when the knob 55 is released the locking catches 53 will again engage in the nearest holes 54 in the quadrants 52 to lock the seat in its new position.

In order to act as a partial counterbalance to the weight of the occupant of the seat and to make it easier for him to adjust the seat whilst seated therein, a pair of compression springs 66 in telescopic tubular housings are connected at each end to fixed pivot pins on the seat back 2 and on the frame members 32, respectively. One of these counterbalance springs 66 is arranged at each side of the seat, but only one can be seen in Figs. 1 and 4.

Footrests 22 are arranged beneath the front of the seat 1 as seen in Figs. 1, 2, 4, 5 and 14. These may be of hollow sheet metal construction for lightness and have rearwardly extending arms 70 having split bearings 71 by which they are mounted on the ends of the hollow shaft 44. The footrest structure 72 is suspended beneath the seat 1 by the suspension rods 73 pivotally connected at their upper ends to the seat 1 and engaging slidably in trunnion blocks 74 pivotally secured at each side of the footrest structure 72. Enlarged heads on the lower ends of the suspension rods 73 support the footrest structure when the seat is out of the aeroplane. Normally they rest on abutments on the aeroplane floor and the sliding connection permits free adjustment in the height of the seat without interfering with the correct position of the footrests. Channel section guides 75 (Figs. 4 and 5) may be provided to assist in directing the occupant's feet onto the footrests 22. The guides 75 are readily separable from the footrests so as to be left behind when the seat is ejected. When the occupants feet are placed on the footrests, this ensures that his legs will be folded compactly in front of his body in a comfortable and protective position so that they will pass freely through the available opening in the aeroplane when the seat is ejected therefrom. It will thus be seen that the occupant of the seat automatically assumes a compactly folded position adapted to protect his body and vital organs against the conditions and stresses which will be met when the seat is ejected from an aeroplane in flight.

The seat 1 and its frame 3 are slidably mounted on the fixed guide 5, Figs. 4, 5, 6, 7 and 8. The fixed guide is a rigid rectangular column secured at its lower end by a bracket 41 anchored to a structural part of the aeroplane so that the guide 5 is directed upwardly toward an opening in the aeroplane cockpit. The guide is formed with channel guides 40 at each side in which engage the rollers 4 on the frame members 32 of the seat frame 3 so that the seat frame 3 fits around the fixed guide 5 as seen in Figs. 5 and 11. In the lower part of the fixed guide 5 is firmly secured the mounting block 10 for the lower end of the ejection gun 7 which is located within the hollow guide 5 and the upper end of which engages the cross beam 11 of the seat frame 3.

Figure 2:
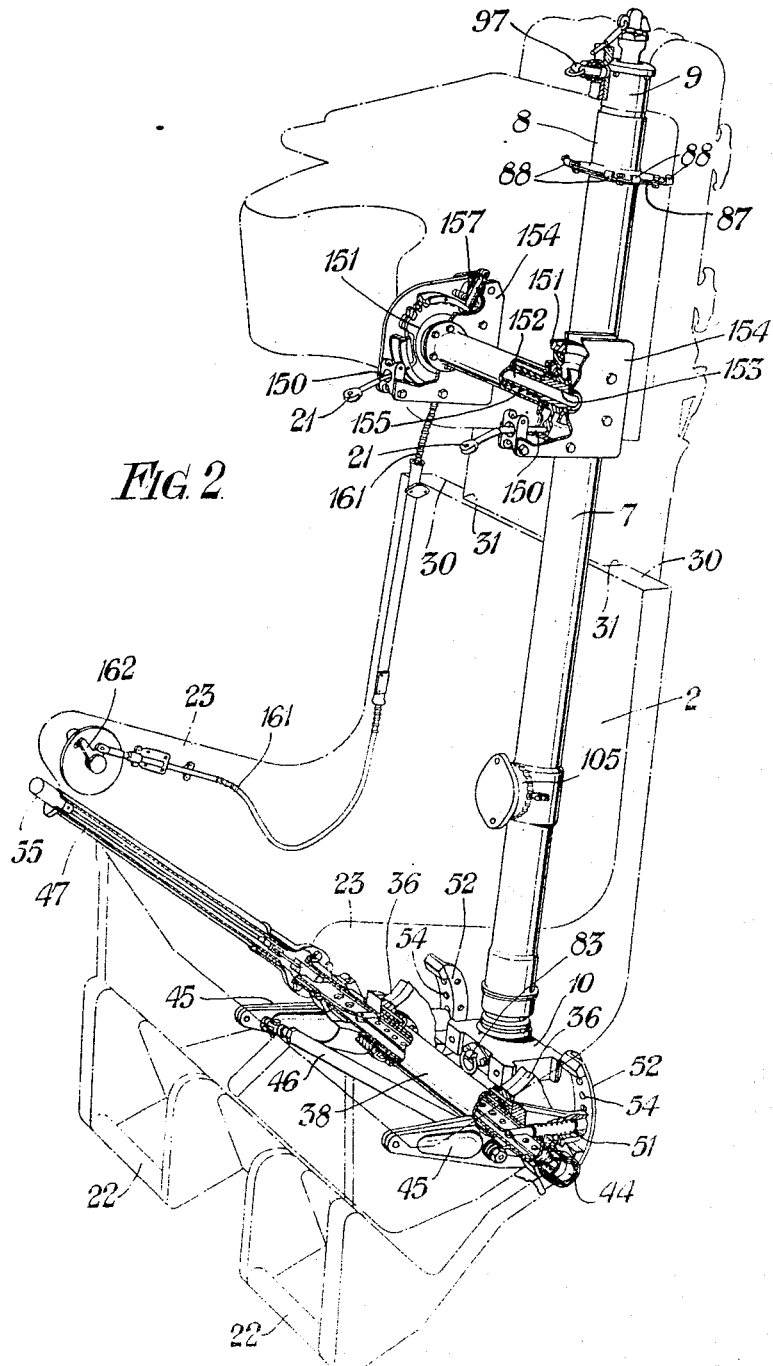
Fig. 2 is a perspective view showing the ejector gun for expelling the seat from an aeroplane and the seat adjustment and harness release mechanism.

The ejection gun 7 is shown as a unit in Figs. 2 and 3 and some details in Figs. 12 and 13. The outer cylinder 8 is closed at its lower end by the cap 80 having a part spherical shoulder 81 adapted to seat in the part spherical seating 82 of the mounting block 10. The cylinder 8 of the ejection gun 7 is held against displacement by the spring-pressed locking catch 83 which engages the flanged end 84 of the cap 80. An opening 85 in the fixed guide 5 enables the locking catch 83 to be withdrawn to release the cylinder 8 of the ejection gun 7 from the mounting block 10. Between flanges 86 on the outside of the cylinder 8 is located a ring 87 so that it may swivel on the cylinder and having spring fingers 88 adapted to engage flexibly against the inner surface of the fixed guide 5 so as to position the cylinder 8 within the guide 5, particularly when the ram 9 has been removed.

The tubular ram 9 has an open piston end 90 and is a slidable working fit in the cylinder 8 and has packing rings to ensure a gas tight joint. In the upper end of the ram 9 is secured the fitting 91 in which is formed a chamber for an explosive cartridge 92 held in position by the breech block 93 see particularly Figs. 3 and 12. The fitting 91 has a part spherical flange 94 which engages in an opening 95 in the cross beam 11 of the seat frame 3 and against the part spherical seating 96 where it is retained by the spring pressed locking catch 97. In the breech block 93 is fitted a spring-loaded firing pin 98 slidably mounted in the guide 99 and forked at its upper end and fitted with a roller 100. In the forked end of the firing pin 98 fits the removable wedge shaped sear 101 having a hook 102 at its forward end with which is connected the flexible lead 15. The rear end of the wedge shaped sear is inclined at 103 to ensure the full removal of the sear 101 when the roller 100 has passed the peak of the wedge-shaped incline of the sear. A percussion cap 104 is provided in the cartridge, positioned so that it will be struck by the firing pin 98 when the cartridge firing mechanism is actuated by a pull on the flexible cable 15. Normally the spring of the firing pin is only lightly compressed. When the cartridge firing mechanism has to be actuated, a pull on the cable 15 withdraws the sear 101 and the first effect is to cause the roller 100 to ride up the incline of the sear 101 thereby drawing back the firing pin 98 and increasing the compression of its spring. When the sear 101 is completely withdrawn, the firing pin 98 is released and is propelled by its spring so as to strike the percussion cap 104 of the cartridge in the firing chamber of the ram 9. This will fire the explosive material in the cartridge 92 which will discharge its gases of combustion under pressure into the expansion chamber constituted by the combined interior of the cylinder 8 and the ram 9. This will force the ram 9 and the cylinder 8 apart and as the cylinder is seated on the seating 82 and secured to the mounting block 10 and thus to the fixed guide 5 and the flange 95 of the ram 9 engages the seating 96 in the cross beam 11 of the seat frame 3, the latter with the seat 1 and its occupant will be propelled along the guide 5 and thereby ejected from the aeroplane.

The ram 9 moving outwardly in the cylinder 8 will rapidly increase the volume of the expansion chamber between them. In order to maintain or increase the effective pressure within the expansion chamber, at least one chamber 105 for an auxiliary cartridge 106 may be provided on the side of the cylinder 8. At least one opening 107 communicates between the interior of the cylinder 8 and the chamber 105 so that as the ram uncovers the opening 107, the hot gases in the cylinder will ignite the explosive material in the cartridge 106 which will then discharge its gases into the expansion chamber between the cylinder 8 and the ram 9. The cartridge 106 may have a perforated cover plate 108 with a thin layer of material 109 such as metal foil over each opening. Variation in the size of the opening thickness of the foil and the nature of the material, will enable the character and rate of combustion of the explosive material to be controlled. A sliding panel 110 (Fig. 1) permits access to the chamber 105 for the removal or replacement of auxiliary cartridges 106.

It is essential to be able to eject the seat freely from the aeroplane directly an emergency arises to make this necessary but it is also necessary that the seat shall be positively secured in the aeroplane at all other times. For this purpose a locking device is provided to secure the ram 9 to the cylinder 8 which is locked to the mounting block 10 fixed in the guide 5 and this is securely anchored to a structural part of the aeroplane. This locking device is adapted to be instantly and automatically released when the ejection gun 7 is operated. The piston end 90 of the ram 9 has an internal bevelled flange 111 and this engages in a channel in the upwardly directed rim 112 of the cap 80 secured in the lower end of the cylinder 8. This rim is divided by a number of radial slits into a series of spring fingers 113 which will readily contract or expand to enable the flange 111 on the piston end of the ram 9 to engage and disengage from the channel in the ring of spring fingers 113. These spring fingers are normally locked in the engaged position shown in Fig. 13 by means of the protruding rim 114 of the locking piston 115 which is slidably mounted in the cap 80 and has a spring 116 which normally urges it upwardly and a knob 117. The ram 9 and cylinder 8 are thus securely locked together but the lock will be instantly released when the gases from the exploded cartridge 92 press back the locking piston 115. This is entirely automatic and requires no action or forethought by the occupant of the seat. The knob 117 enables the lock to be released by hand without firing the cartridge, when it is required to disassemble the gun or for other purposes.

When the seat has been ejected from an aeroplane, a drogue parachute is automatically released and developed to steady the seat in the air and prevent the occupant being subjected to wild gyrations which might render him incapable of taking the further steps required to ensure a successful parachute descent. The drogue parachute 17 is connected to the cross beam 11 of the seat frame 3 by the strong nylon cables 120 connected to the eyes 121 fixed in the cross beam 11 and is stowed in the upper compartment of the container 12 beneath the neatly folded flaps 122. The drogue parachute 17 is withdrawn from the container 12 and is projected upwardly away from the slip-stream of the aeroplane by means of a drogue parachute gun 18 which is shown in Fig. 4 detachably mounted on the side of one of the seat frame members 32 by means of releasable clamps 123.

The drogue gun 18 is provided with a chamber for a cartridge and is fired by cartridge firing mechanism 124 similar to the firing mechanism of the ejection gun 7. The trigger 125 is operated automatically by a static line 19 detachably connected to the trigger 125 so as to be instantly released from it directly the trigger has been pulled thus leaving the seat 1 entirely separated from the aeroplane. The static line 19 runs through the tubular guide 126 on the side of the seat frame 3.

Figures 15, 16:
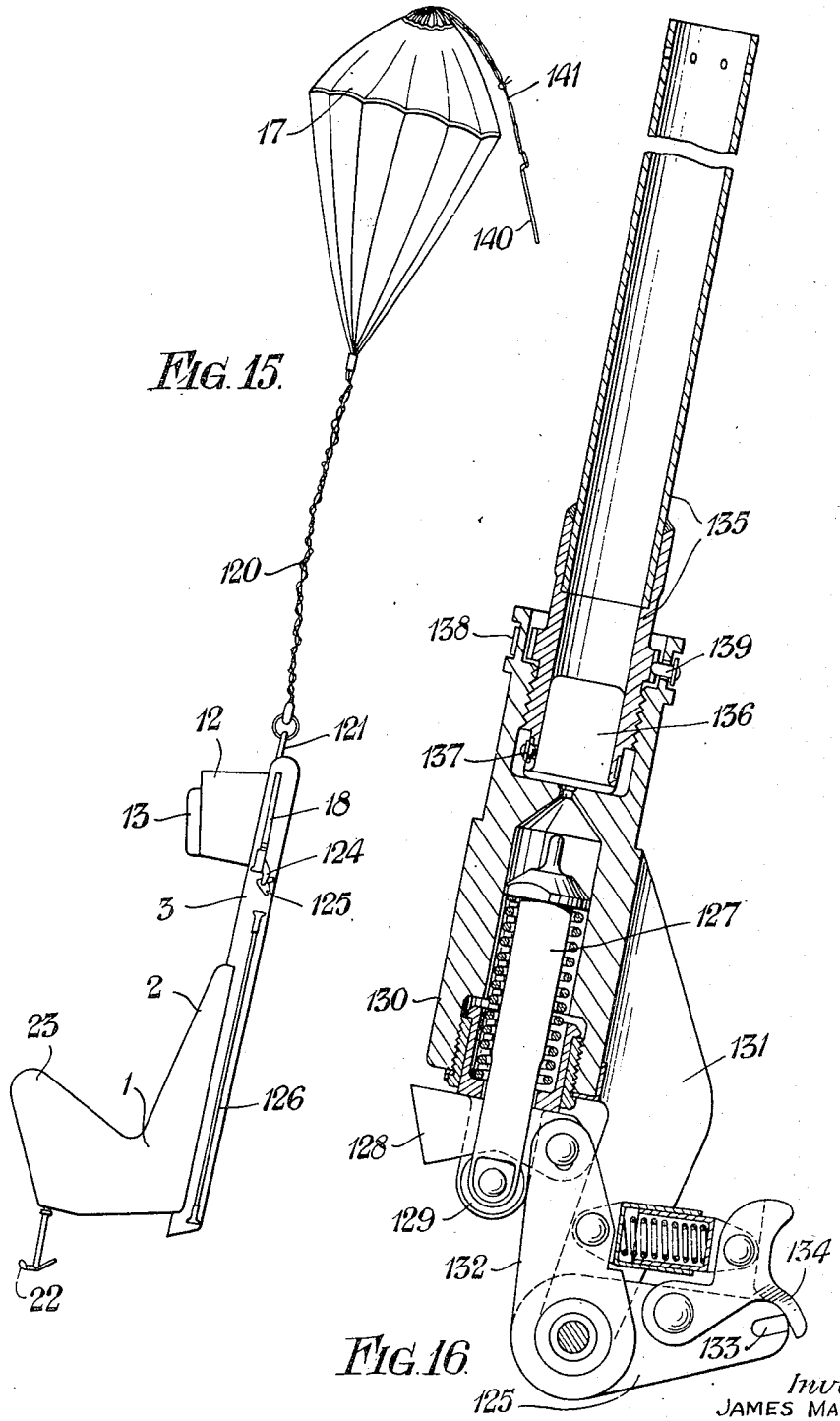
Fig. 15 is a diagrammatic view showing the seat after it has been ejected from an aeroplane and having a drogue parachute which is brought out and developed automatically.
Fig. 16 is a sectional elevation through the barrel of the drogue parachute gun, part of which is broken away for convenience of illustration.

The seat 1 is shown after ejection from the aeroplane and with the drogue parachute 17 developed, in Fig. 15 and Fig. 16, shows details of the drogue gun 18 in sectional elevation and to a larger scale. The body 130 of the drogue gun 18 contains the firing mechanism 124 which includes the spring loaded firing pin 127 adapted to be drawn back and released by the wedge-shaped sear 128 acting on the roller 129 supported in the forked end of the firing pin 127. The trigger 125 is pivoted to brackets 131 on the body of the gun and is connected to the sear 128 by the lever 132. An eye on the end of the static line 19 normally engages in the slotted end 133 of the trigger 125 and is retained against accidental displacement by the spring pressed guard 134. The guard 134 readily gives way to enable the eye on the static line 19 to be pulled out of the slot 133 when the trigger is turned down after having fired the gun. The barrel 135 of the drogue gun is screwed into the body 130 of the gun and thereby closes the breech end of the barrel 135 which receives an explosive cartridge 136. A spring ring 137 encircles the breech end of the barrel and a pin on the ring projects through a hole in the barrel and presses on the cartridge case therein so as to hold it in place when the barrel 135 is removed from the body 130. A spring ring 138 is located in a channel in the upper end of the body 130 and has a pin 139 which projects through a hole in the body 130 to engage serrations on the gun barrel 135 to prevent it becoming accidentally unscrewed. The gun has a piston 140 which is an easy sliding fit in the gun barrel 135 (but is not shown in Fig. 16). It is however seen in Figs. 1, 4 and 15 but to a much smaller scale. It is attached by the cable 141 to the upper end of the drogue parachute 17 so that this will be drawn out of its compartment in the container 12 when the gun is fired and will be impelled well away from the seat and the aeroplane so that it will open and develop satisfactorily.

In high speed aeroplanes the occupants are usually secured in their seats by connections to their harness. The harness release mechanism is shown in Figs. 2, 17, 18 and 19. The pick up ends 21 on the security cables 150 are intended for connection to the personal harness of the occupant of the seat in the usual way to secure the occupant against accidental displacement during rough weather or when the aeroplane is performing evolutions such as steep "banks," "rolls" or "loops." The security cables 150 are wound upon reels 151 on the tubular shaft 152 mounted in bearings 153 in a housing 154 located in the lower part of the container 12 of the seat. A stout torsion spring 155 tends to wind the cables 150 on the reels 151, the ends of the cables being secured one to each reel at 156. A locking catch 157 is spring pressed into engagement with ratchet teeth 158 on one of the reels 151. The locking catch 157 may be withdrawn by the levers 159 and 160 connected by the flexible cable 161 to a hand control lever 162 mounted on one of the wings 23 of the seat 1. When the locking catch 157 is withdrawn, the occupant may stretch or lean forward, drawing the cables 150 off the reels 151 thus providing a limited amount of controlled freedom of movement to the occupant of the seat, whilst maintaining a positive connection by which the occupant's harness is anchored to the seat. The hand control lever 162 enables this control to be relaxed to allow a considerable amount of freedom to the occupant of the seat, but when the locking catch 157 is relased, the cables 150 will be automatically rewound and the reels 151 will be locked when the occupant settles back in the seat.

The head and face protecting screen 170 is shown in detail in Figs. 20 and 21. The screen is normally stowed in the container 12 but is secured by its forward edge 171 to the cross bar 172 of the handle 14 by which it may be drawn down over the head and face of the occupant of the seat as shown in dot and dash lines in Fig. 4. When fully extended it will take the shape shown in Fig. 21 in which the centre section 173 is domed to fit comfortably over the face of the seat occupant. The upper edge 174 is folded over to form a loop for securing within the container 12. The cable 15 for operating the cartridge firing mechanism of the ejection gun 7 is connected to a loop 175 in a cable 176 embedded in the screen 170 and which has its two ends 177 folded round the cross bar 172 of the handle 14 and extended laterally and secured within the folded end of the material of the screen. In Fig. 20 the screen is pressed substantially flat to permit it to be rolled or folded for stowing in the container 12. The material of the screen is preferably a relatively stiff close woven canvas which will give the desired protection to the face, eyes, nose and mouth of the occupant but which will not be pressed tightly in place so as to prevent him breathing freely. It must however give full protection against inflation of the lungs by the great air pressure which will be met by the occupant of the seat when it is ejected with an occupant, from an aeroplane moving at high speed.

In an example of how the ejection seat operates when fitted to a high speed fighter aeroplane, the seat is secured in place in the cockpit of the aeroplane by securing the bracket 41 to the floor or other structural part of the aeroplane, with the fixed guide directed toward the cockpit opening. The pilot sits in the seat and raises or lowers the seat pan means of the hand lever 47 so as to bring his eyes to the normal sight line for normal flying and for using the gun sight. This does not affect the height of the cockpit hood or detract in any way from the effective stroke of the ejection gun for ejecting the seat from the aeroplane. The pilot is secured in place by his harness which is connected to the pick up anchorage points 21. This does not interfere with adjustment of the seat by the hand lever 47 assisted by the balance springs 66. Considerable freedom of movement is allowed if the hand control lever 162 is actuated to operate the harness release mechanism. The pilot thus occupies a compact and comfortable seat which conforms with all normal requirements.

If an emergency arises or if after mature consideration, the pilot decides that it is necessary for him to make a parachute escape from the aeroplane, he only needs to jettison the cockpit hood, bring his feet onto the footrests 22, grasp the handle 14 in both hands and pull the protective screen 170 over his head and face. These actions automatically fold the limbs in a compact and comfortable position for ejection from the aeroplane and enable the pilot to withstand the rapid acceleration to which he will be subjected during this operation. The protective screen 170 will shield him against the effects of air pressure and blast which he will meet as soon as he is ejected from the aeroplane cockpit. The act of pulling on the handle 14 will pull the flexible cable 15 so as to actuate the cartridge firing mechanism to fire the cartridge 92 in the ejection gun 7. The gases of combustion will increase the pressure in the space between the cylinder 8 and the ram 9 and this pressure acting on the locking piston 115 will press it back so as to unlock the connection between the cylinder 8 and the ram 9. The pressure will then force the ram 9 and the cylinder 8 apart and when the piston end of the ram 9 uncovers the opening 107 to the auxiliary cartridge chamber 105, the hot gases will explode the cartridge 106 and its gases of combustion will be added to those from the cartridge 92 so as to maintain the desired propulsive effect on the ram 9. This is in turn applied to the transverse beam 11 of the seat frame 3 and the seat 1 and frame 3 will be propelled along the fixed guide 5 and will be ejected with the pilot from the aeroplane and well away from the tail plane, fin and other parts of the aeroplane.

When the seat and the pilot has been ejected from the aeroplane and propelled clear of any parts thereof, the static line 19 will be drawn taut and the firing mechanism 124 of the drogue parachute gun will be actuated to fire the cartridge 136 in the drogue gun 18 and this will release the static line 19 from the slotted end 133 of the trigger 125 thereby entirely disconnecting the seat from the aeroplane. Firing of the cartridge 136 expels the piston 140 from the drogue gun 18 and draws out and developes the drogue parachute 17 as shown in Fig. 15. The drogue parachute 17 acts to steady the seat and to prevent it gyrating wildly or turning over and over until it settles into a steady descent with its occupant. The occupant may now release himself from the seat and may pull the rip cord of his parachute in the normal way.

For purposes of inspection and maintenance the seat may be readily removed from the aeroplane by releasing the locking catch 97 and lifting the seat out along the fixed guide 5. The ejection gun 7 may be readily detached as a unit by releasing the locking catch 83, and the locking piston 115 may be unlocked by pulling on the knob 117 to enable the cylinder and ram to be separated. Fresh cartridges 92, 106 and 136 may be placed in their respective chambers, when required. All the parts are readily interchangeable and replaceable.

An alternative arrangement of harness release mechanism is shown in Figs. 22 and 23. The security cables 150 are wound upon two reels 151 each mounted in bearings in separate housings 154 one of which is secured to each of the seat frame members 32. Each cable 150 is secured to its reel at 156 and both reels have ratchet teeth 128 with which engages a locking catch 163. The two locking catches are connected by links 164 to levers 165 on a cross shaft 166 so that both locking catches 163 will be released simultaneously by the cable 161 connected to one of them. A separate volute spring 167 is provide for each reel 151 and a detachable cover plate 168 is fitted to each housing 154. The arrangement is substantially similar to that shown in Figs. 17, 18 and 19 except that the separate housings 154 are each separately secured to the frame members 32 and the connecting tubular shaft 152, spring 155 and enclosing tube are omitted. Each cable 150 passes through a fairlead 169 on the side of the container 12.

A retractable pivotal abutment for mounting in the seat back 2 to engage the guides 48, is shown in Fig. 24. The pivot pin 50 is slidably mounted in the guides 180 in the upper part 30 of the seat back 2 and its projecting abutment 49 normally engages in the guides 48 on the seat frame members 32, a coil spring 181 holds each abutment in engagement in its guides 48. A plunger 182 is mounted in a guide 183 in the seat back 2 and a flattened wedge-shaped end 184 projects into a slot 185 in the pivot pin 50 and engages a roller 186 mounted in the slot 185. By pressing on the flanged end 187 of each plunger 182, the pivot pins 50 will be retracted thus withdrawing their abutments 49 from the guides 48 in the frame members 32. This releases the seat back 2 from the seat frame and withdrawal of the pivot pins from the lugs 43 will enable the seat pan 1 and back 2 to be quickly released from its frame. The shank of each plunger 182 serves as an anchorage for the upper end of the balance springs 66, which must be detached before the plunger can be actuated.

I claim:

1. An ejection seat for aeroplanes comprising a seat having a seat pan and a seat back, a frame for the seat, guides on the seat frame, slidable and pivotal connections between the seat back and the guides on the seat frame, side members to the seat frame, a cross beam connecting their upper ends, forwardly projecting lugs at their lower ends, a tubular distance piece connecting these lugs in spaced relationship, a tubular shaft mounted in bearings in the tubular distance piece, lever arms mounted on this shaft, connections from the end of these lever arms to the underside of the seat pan, rearwardly directed extensions to the lever arms and spring actuated locking catches in these extensions, a hand lever on the tubular shaft for raising and lowering the seat in its guides on the seat frame, hand actuated means for releasing the locking catches, perforated quadrants on the seat frame with which the locking catches normally engage, an upwardly directed guide located between the side members of the seat frame, rollers on the seat frame, channels in the guide with which the rollers engage, means for securing the guide to a structural part of the aeroplane, an ejection gun releasably between abutments on the fixed guide and the cross beam of the seat frame and cartridge firing mechanism for discharging at least one cartridge in the ejection gun.

2. An ejection seat for aeroplanes according to claim 1 having a protective screen adapted to be drawn in front of the face and head of the occupant of the seat, a handle to the face screen for this purpose and a connection from the handle to the cartridge firing mechanism of the ejection gun, footrests having rearwardly directed arms pivotally supported on the tubular shaft beneath the seat pan and suspended at the front thereof by rods pivotally supported by the seat and slidable in pivoted trunnions in the footrest structure.

3. An ejection seat for aeroplanes according to claim 1 having a container mounted on the front of the seat frame above the seat back, a headrest on the front of the container, a drogue parachute folded and stowed within the container, strong flexible connections from the drogue parachute to the cross beam of the seat frame, a drogue gun mounted on a member of the seat frame, a piston in the barrel of the drogue gun, a cartridge chamber and firing mechanism in the body of the gun, automatic means for discharging the cartridge in the drogue gun after the ejection seat is clear of the aeroplane and a flexible connection from the piston to the drogue parachute.

4. An ejection seat for aeroplanes according to claim 1 having a container mounted on the front of the seat frame above the seat back, a headrest on the front of the container, a drogue parachute folded and stowed within the container, strong flexible connections from the drogue parachute to the cross beam of the seat frame, a drogue gun mounted on a member of the seat frame, a piston in the barrel of the drogue gun, a cartridge chamber between the barrel and body of the gun, a spring loaded firing pin axially displaceable in the body of the gun, an abutment on the firing pin, a transversely withdrawable wedge-shaped sear engaging the abutment, a trigger device for withdrawing the wedge shaped sear, a sufficient length of static line stowed in a container and anchored at one end to the aeroplane, an automatically releasable connection at the other end of the static line connecting it to the trigger device so that it will be automatically released when the firing mechanism has been actuated to discharge the cartridge in the gun.

5. An ejection seat for aeroplanes according to claim 1 having a container mounted on the front of the seat frame above the seat back, a headrest on the front of the container, a drogue parachute folded and stowed within the container, strong flexible connections from the drogue parachute to the cross beam of the seat frame, a drogue gun mounted on a member of the seat frame, a piston in the barrel of the drogue gun, a cartridge chamber and firing mechanism in the body of the gun, automatic means for discharging the cartridge in the drogue gun after the ejection seat is clear of the aeroplane and a flexible connection from the piston to the drogue parachute, a releasable harness connection for securing the occupant in the seat comprising flexible cables with pick up connectors for securing to the occupant's harness, at least one housing mounted on the seat frame, a reel mounted in bearings in each housing and on which the cables are wound and anchored, spring means opposing unwinding of the cables, ratchet teeth on each of the reels, a spring loaded locking catch which engages each set of the ratchet teeth and hand controlled means for withdrawing each locking catch when desired.

6. An ejection seat according to claim 1 having an ejection gun comprising a cylinder disposed within the fixed guide, a mounting block secured in the lower end of the fixed guide, an end cap secured to the lower end of the cylinder, a part spherical collar on the end cap, a part spherical seating in the mounting block, a spring loaded locking catch securing the cylinder to the mounting block, a hollow tubular ram slidable in the cylinder and projecting from its upper end beyond the fixed guide, a cartridge chamber in a fitting secured in the upper end of the ram, a part spherical flange on the fitting, a part spherical seating in a through opening in the cross beam of the frame of the seat and in which the ram engages a spring loaded locking catch which engages this flange, a removable breech block fitted in the breech of the cartridge chamber, a spring loaded firing pin mounted for axial movement in the breech block, an abutment on the firing pin, a transversely withdrawable wedge shaped sear engaging this abutment to first cock and then release the firing pin.

7. An ejection seat according to claim 1 having an ejection gun comprising a cylinder disposed within the fixed guide, a mounting block secured in the lower end of the fixed guide, an end cap secured to the lower end of the cylinder, a part spherical collar on the end cap, a part spherical seating in the mounting block, a spring loaded locking catch securing the cylinder to the mounting block, a hollow tubular ram slidable in the cylinder and projecting from its upper end beyond the fixed guide, a cartridge chamber in a fitting secured in the upper end of the ram, a part spherical flange on the fitting, a part spherical seating in a through opening in the cross beam of the frame of the seat and in which the ram engages, a spring loaded locking catch which engages this flange, a removable breech block fitted in the breech of the cartridge chamber, a spring loaded firing pin mounted for axial movement in the breech block, an abutment on the firing pin, a transversely withdrawable wedge shaped sear engaging this abutment to first cock and then release the firing pin, a flexible fabric face screen normally stowed in a compartment of the container on the seat frame, a handle outside the compartment and connected to the screen and a flexible cable connecting the handle and face screen with the wedge-shaped sear of the cartridge firing mechanism.

JAMES MARTIN.

REFERENCES CITED

The following references are of record in the file of this patent:

UNITED STATES PATENTS

| Number | Name | Date |
| --- | --- | --- |
| 2,457,252 | Martin | Dec. 28, 1948 |
| 2,459,948 | Lobelle | Jan. 25, 1949 |
| 2,467,763 | Martin | Apr. 19, 1949 |